United States Patent
Spellman et al.

(10) Patent No.: US 9,308,995 B2
(45) Date of Patent: Apr. 12, 2016

(54) OVERHEAD SPACE UTILIZATION DEVICE

(71) Applicant: Greenpoint Technologies, Inc., Kirkland, WA (US)

(72) Inventors: Jeffrey E. Spellman, Bellevue, WA (US); Camillus A. Cullen, Kenmore, WA (US)

(73) Assignee: Greenpoint Technologies, Inc., Kirkland, WA (US)

( * ) Notice: Subject to any disclaimer, the term of this patent is extended or adjusted under 35 U.S.C. 154(b) by 119 days.

(21) Appl. No.: 13/975,164

(22) Filed: Aug. 23, 2013

(65) Prior Publication Data

US 2014/0054417 A1    Feb. 27, 2014

Related U.S. Application Data

(60) Provisional application No. 61/692,905, filed on Aug. 24, 2012.

(51) Int. Cl.
    *B64D 11/00*    (2006.01)
(52) U.S. Cl.
    CPC ........ *B64D 11/00* (2013.01); *B64D 2011/0076* (2013.01); *B64D 2011/0084* (2013.01)
(58) Field of Classification Search
    CPC ...................................................... B64D 11/00
    USPC .......................... 105/314, 315, 316, 344, 345;
                               244/118.5, 118.6, 118.1, 118.2
    See application file for complete search history.

(56) References Cited

U.S. PATENT DOCUMENTS

| | | | | |
|---|---|---|---|---|
| 4,066,227 A * | 1/1978 | Buchsel | ...................... | 244/118.6 |
| 5,842,668 A * | 12/1998 | Spencer | ...................... | 244/118.1 |
| 6,003,813 A * | 12/1999 | Wentland et al. | .......... | 244/118.5 |
| 6,073,883 A * | 6/2000 | Ohlmann et al. | .......... | 244/118.5 |
| 6,536,710 B1 * | 3/2003 | Bobzien et al. | ................ | 244/119 |
| 6,848,654 B1 * | 2/2005 | Mills et al. | .................. | 244/118.5 |
| 6,883,753 B1 * | 4/2005 | Scown | ........................ | 244/118.1 |
| 7,762,496 B2 * | 7/2010 | Seiersen et al. | ............ | 244/118.5 |
| 8,776,353 B2 * | 7/2014 | Herzog et al. | .............. | 29/525.01 |
| 2005/0178909 A1 * | 8/2005 | Mills | ........................... | 244/118.6 |
| 2005/0184194 A1 * | 8/2005 | Schaefer et al. | ............ | 244/118.1 |
| 2006/0049310 A1 * | 3/2006 | Park et al. | ................... | 244/118.5 |
| 2008/0073463 A1 * | 3/2008 | Guering | ..................... | 244/118.6 |
| 2008/0277527 A1 * | 11/2008 | Fokken et al. | .............. | 244/118.1 |
| 2011/0062283 A1 * | 3/2011 | Breuer et al. | ............... | 244/118.5 |

* cited by examiner

*Primary Examiner* — Christopher P Ellis
*Assistant Examiner* — Richard G Davis
(74) *Attorney, Agent, or Firm* — Seed IP Law Group PLLC

(57) ABSTRACT

One particular overhead space utilization device, adapted for installation in a hull structure, incorporates at least one berth module with first and second berth portions, first and second intermediate support members, and first and second coupling members. Each berth module has two opposing berth members with a walkway therebetween. The first and second intermediate support members each has a first end pivotably coupled to the corresponding one of the first and second berth portions, and a second end configured to be pivotably coupled to the hull structure. The first and second coupling members are configured to pivotably couple the second berth portions to the hull structure. The first and second coupling members and the second berth portions are configured to be positioned outboard of the first berth portion.

15 Claims, 14 Drawing Sheets

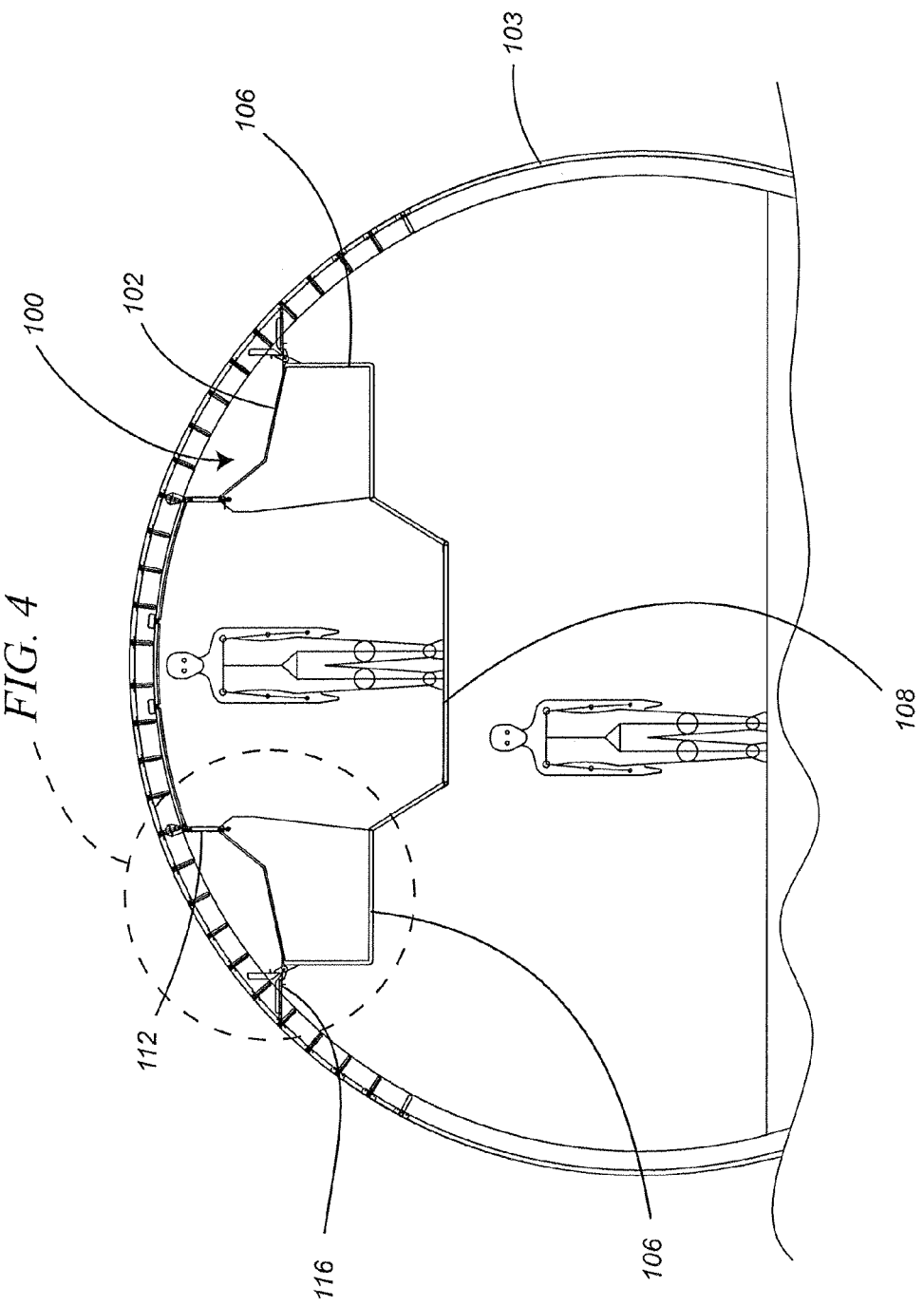

OVERHEAD SPACE UTILIZATION DEVICE

BACKGROUND

1. Technical Field

The present disclosure generally relates to interior accommodations or monuments in a vessel, and more particularly, to an overhead space utilization device converting a space inside a vessel, such as an aircraft, into usable quarters.

2. Description of the Related Art

Vessels such as aircraft, trains, ships, boats, buses, and the like, generally may include quarters for resting or other purposes at one end of the vessel or somewhere else in the vessel, occupying space in the vessel cabin. For example, in aircraft, crew rest areas are included toward one end of the aircraft taking up useful space that can otherwise be used as a galley, entertainment system, a bathroom, or simply be left empty to allow more walking room. Certain aircraft with sufficient cabin height may raise the crew rest area, however, these designs are limited in size and location due to adverse impacts their stiff connection may have when the aircraft fuselage deforms or bends when in motion.

FIG. 1A illustrates an aircraft vessel 10 according to prior art. FIG. 1B illustrates a partial cross-sectional view of the aircraft vessel 10. Typically, the aircraft 10 is equipped with overhead stow bins 12. In certain applications it may be desirable for space utilization to use the overhead space for something other than stow bins. For example, in private or military aircraft applications, the user may prefer to have more personal use space, such as sleeping quarters, offices, gaming rooms, lounge, or the like. However, in existing aircraft interior configurations, stow bins and on-aircraft floor crew rest areas consume valuable space without offering any alternatives to more efficiently take advantage of the volume of aircraft.

SUMMARY OF THE INVENTION

In one embodiment, an overhead space utilization device, adapted for installation in a hull structure, incorporates at least one berth module with first and second berth portions, first and second intermediate support members, and first and second coupling members. Each berth module has two opposing berth members with a walkway therebetween. The first and second intermediate support members each has a first end pivotably coupled to the corresponding one of the first and second berth portions, and a second end configured to be pivotably coupled to the hull structure. The first and second coupling members are configured to pivotably couple the second berth portions to the hull structure. The first and second coupling members and the second berth portions are configured to be positioned outboard of the first berth portion.

In another embodiment, an overhead space utilization device incorporates a berth module having two opposing berths, and is configured to be installed in an aircraft fuselage. Each berth incorporates first and second coupling locations, the first coupling location being positioned above and inboard the second coupling location when the berth module is installed in the aircraft. First and second isolated brackets have distal ends configured to be fixedly coupled to the fuselage and proximal ends converging toward each other with a space between the proximal ends. A rail member is coupled to the first and second isolated brackets toward the proximal ends thereof. A fitting is coupled to the second coupling location of a corresponding one of the opposing berths and pivotably coupled to the rail member.

In an embodiment, an aircraft incorporates a fuselage, a first berth, a second berth, and a walkway therebetween. The first berth has first and second locations pivotably coupled to the fuselage. The second berth also has first and second locations pivotably coupled to the fuselage. The walkway is positioned between, and is pivotably coupled to, the first and second berths.

BRIEF DESCRIPTION OF THE SEVERAL VIEWS OF THE DRAWINGS

FIG. 3 is a partial cross-sectional view of the aircraft fuselage and overhead space utilization device of FIG. 2, taken across section 3-3.

DETAILED DESCRIPTION

For clarity, embodiments of the present disclosure are described in relation to a case where the vessel is an aircraft; however, it is understood that various embodiments may be used on other types of vessels or vehicles, such as trains, ships, boats, buses, cars, spacecraft and the like, or even buildings or boathouses susceptible to moving or relative deformation during movement.

Figure 1A:
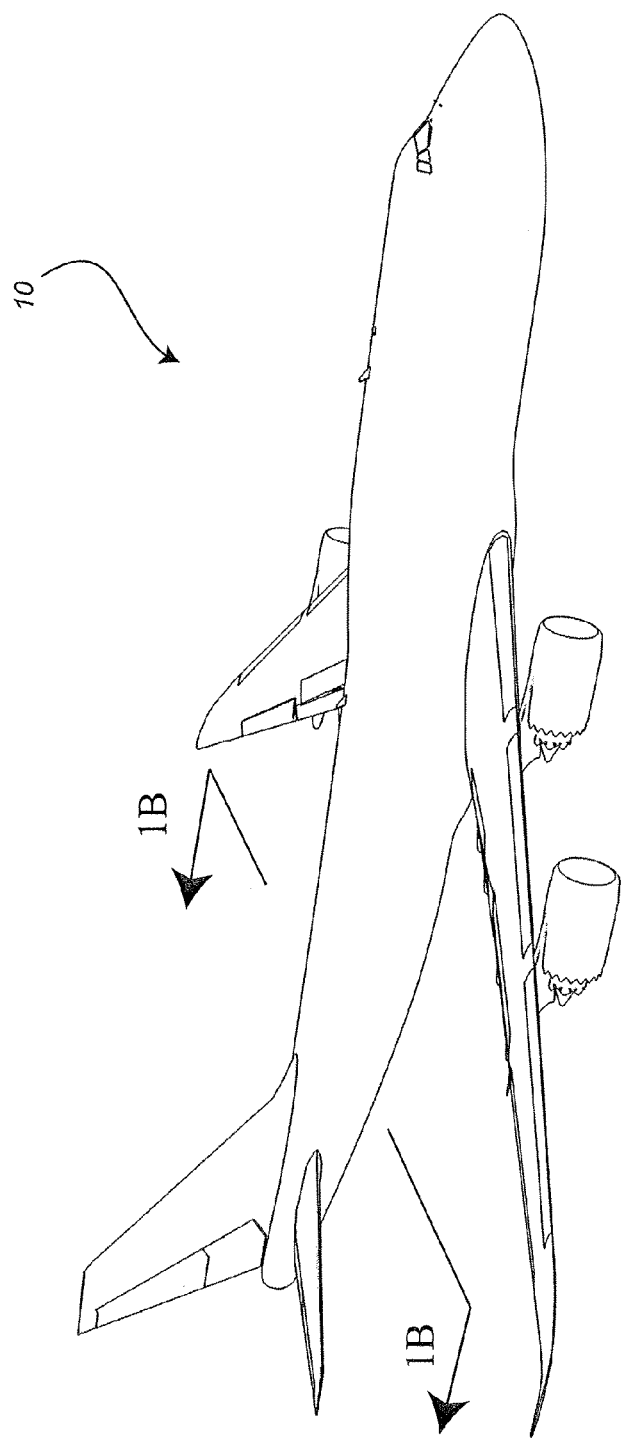
FIG. 1A is an isometric view of an aircraft having a fuselage according to prior art.
Figure 1B:
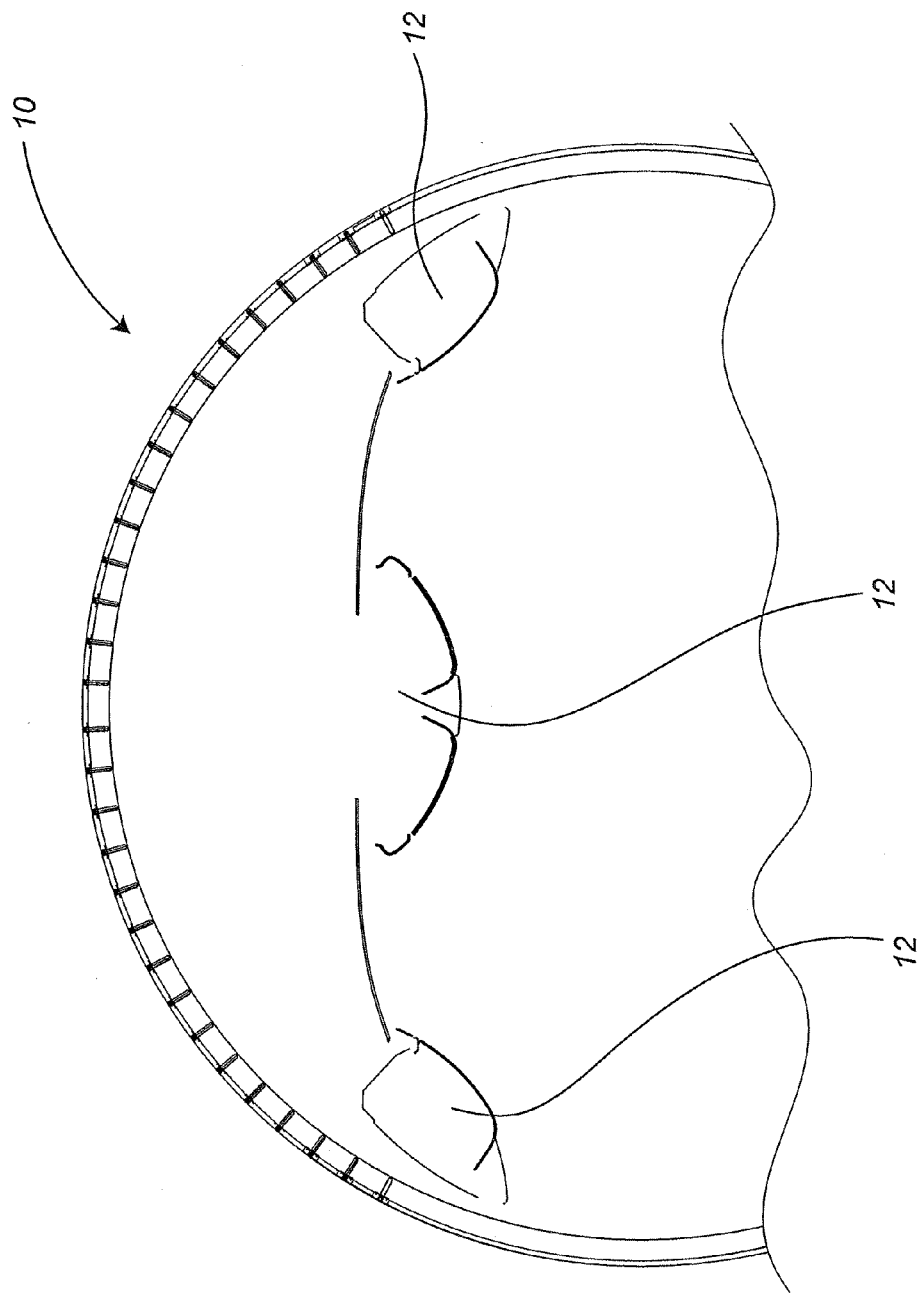
FIG. 1B is a partial cross-sectional view of the aircraft fuselage of FIG. 1A according to prior art, taken across section 1B-1B.
Figure 2:
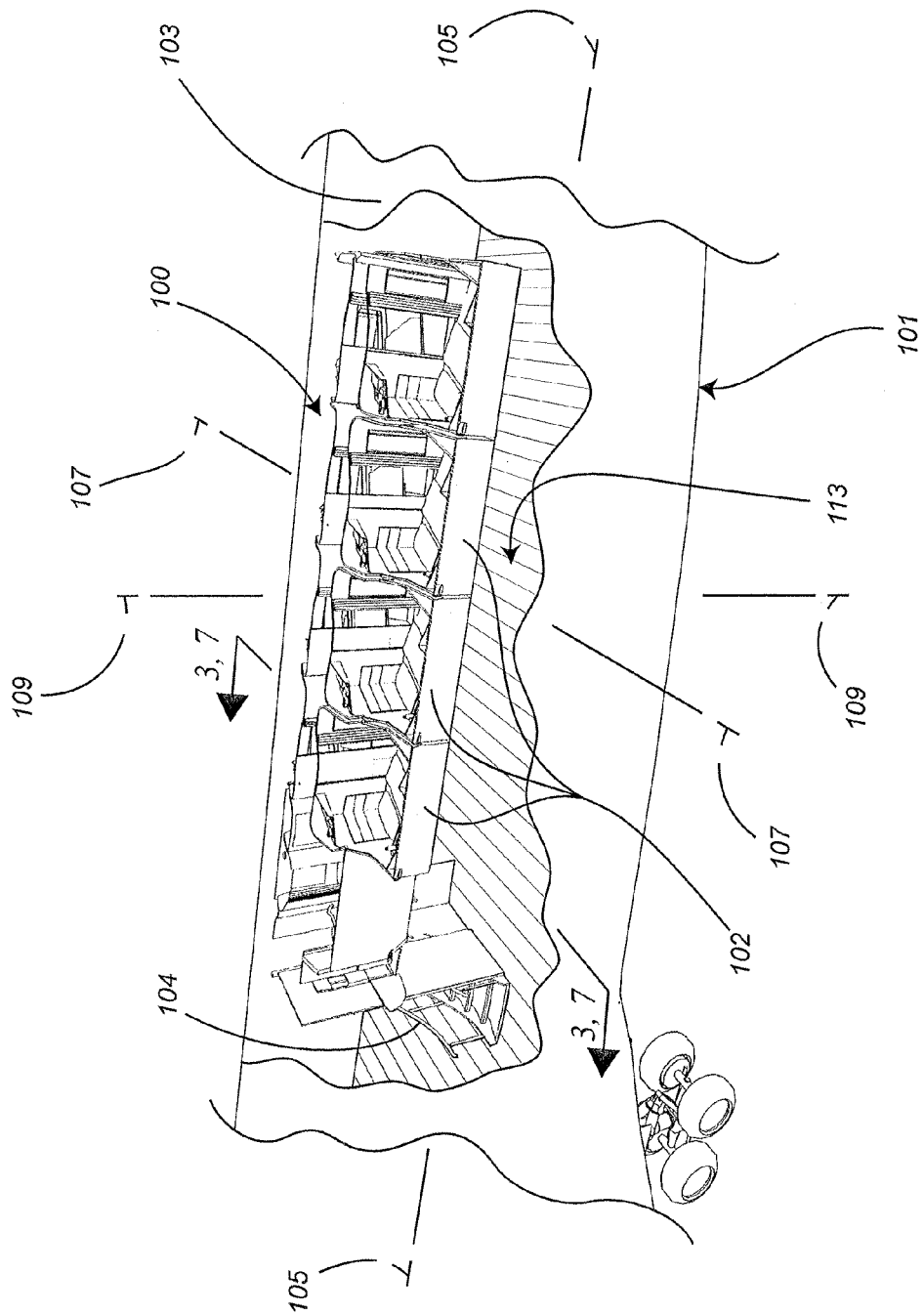
FIG. 2 is a cutaway isometric view of a portion of an aircraft having a fuselage with an overhead space utilization device according to an embodiment installed therein.

FIG. 2 illustrates one embodiment of an overhead space utilization device 100 shown in an installed configuration inside an aircraft 101. In one aspect, the device 100 includes at least one or more berth modules or quarters 102 coupled to the aircraft 101 and configured to move with respect to a fuselage 103 of the aircraft 101, preventing or mitigating rigid reactions to fuselage deflections during flight, taxying, or any other condition under which the fuselage 103 may deflect or otherwise move or shift.

In one embodiment, the device 100 includes a stair module 104 coupled to the fuselage 103, for example to a floor structure 113 thereof, such as seat tracks or floor beams, and leading and/or coupled to at least one of the berth modules 102. Typically the fuselage 103 includes a longitudinal or roll axis 105 substantially perpendicular to a lateral or pitch axis 107 extending laterally, and to a yaw axis 109 extending between lower and upper portions of the fuselage 103.

FIG. 3 illustrates a cross-sectional view of one embodiment of a berth module 102 of the device 100 installed in the fuselage 103. In one aspect, each berth module 102 can include opposing berths 106 and walkway 108 therebetween. Other suitable configurations are contemplated to be within the scope of the present disclosure.

Figure 4:
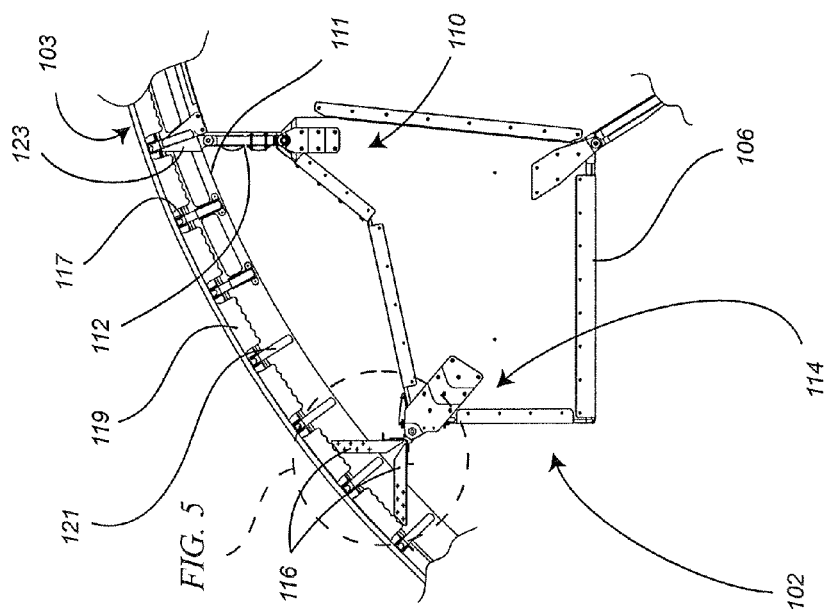
FIG. 4 is a partial front view of a coupling region of an overhead space utilization device according to one embodiment.

FIG. 4 illustrates one aspect of a coupling between one berth 106 and the fuselage 103, and the opposing berth's connection with the fuselage 103 can be substantially similar according to one embodiment. In one aspect, the berth module 102 is configured to be movably coupled with respect to the fuselage 103. For example, in one embodiment, each berth 106 includes a first berth portion 110 rotatably or pivotably coupled with respect to the fuselage 103, for example rotatably or pivotably coupled thereto to be free to rotate or pivot about an axis parallel to the longitudinal axis 105 (FIG. 2).

In one aspect the first berth portion 110 is coupled to the fuselage such that movement of the berth 106 along a direction parallel to the yaw axis 109 is inhibited or prevented. For clarity, the direction parallel to the yaw axis 109 will be referred to as "up" and "down" without any intention to limit the generality or scope of the present disclosure. For clarity, "rotatable" and "pivotable" relationships shall be referred to as "pivotable" without any intention to limit the generality or scope of the present disclosure.

The first berth portion 110 of the berth 106 can in various embodiments be differently configured to be pivotably coupled to the fuselage 103. For example, in some embodiments, the berth 106 can be pivotably coupled to one or more fuselage frame 111, stringer 117, shear tie 119, and/or intercostal 121, or any combination thereof, via a coupling member 123 such as a clevis, fitting, support beam, support panel, tie-rod, bearing, or any other pivotable connection, and/or any combination thereof.

In the illustrated embodiment of FIG. 4, the device 100 includes an intermediate support member 112 having a first end pivotably coupled to the fuselage 103 and a second end pivotably coupled to the first berth portion 110. The intermediate support member 112 is configured to substantially prevent or inhibit or mitigate the first berth portion 110 from translating in the up and down direction 109 (FIG. 2). The intermediate support member 112 can include any suitable intermediate structure, such as but not limited to a tie-rod, link, support beam configured to extend longitudinally along an axis parallel to the longitudinal axis 105 (FIG. 2).

In one embodiment, the berth 106 includes a second berth portion 114 configured to be rotatably or pivotably coupled to the fuselage 103. For example, in the illustrated embodiment of FIG. 4, the second berth portion 114 is coupled to the fuselage 103 such that it can pivot with respect to the fuselage 103 about the longitudinal axis 105 (FIG. 2).

The second berth portion 114 can be configured to be pivotably coupled to the fuselage 103 or at least one frame 111, stringer 117, shear tie 119, or intercostal 121, or any combination thereof, via any suitable pivotable attachment. For example, in the illustrated embodiment of FIG. 4, the device 100 can include support fittings 116 coupled to at least one of the fuselage 103 frame 111, stringer 117, shear tie 119, intercostal 121 or any combination thereof.

Figure 5:
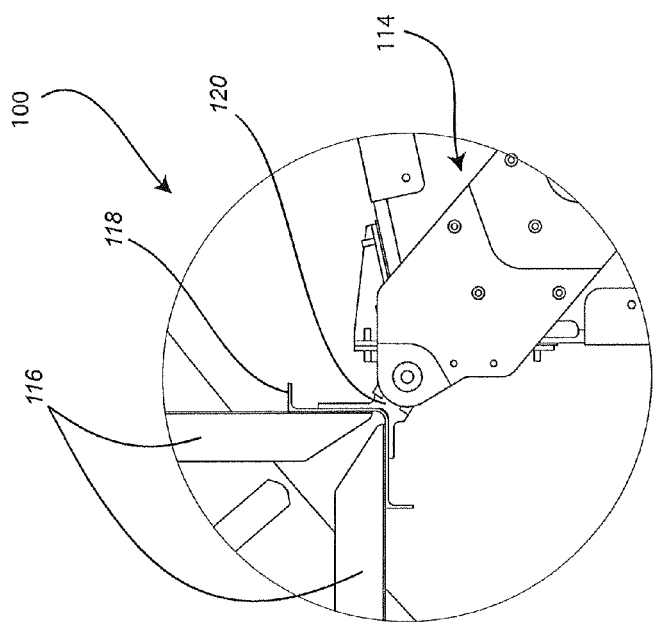
FIG. 5 is a partial front view of the coupling region of FIG. 4 according to one embodiment.

As more clearly illustrated in FIG. 5, the device 100 can further include a support rail or other coupling member 118 coupling the fittings 116 together, which may or may not be directly coupled to each other, and both are coupled to the support rail 118. In the illustrated embodiment, the fittings 116 are not coupled directly to each other. The support rail 118 may extend along an axis substantially parallel to the longitudinal axis 105 (FIG. 2). In one aspect, the device 100 includes a coupling member 120 such as a clevis, fitting, support beam, support panel, tie-rod, bearing, or any other pivotable connection, pivotably coupling the second berth portion 114 to the fuselage 103.

Referring to FIG. 4, in one aspect, portions and/or corners of the berth 106, other than the first and second berth portions 110, 114 are floating and not connected to the fuselage 103. In one aspect, the first and second berth portions 110, 114 are positioned toward an upper region of the berth 106, and the second berth portion 114 is located outboard and lower than the first berth portion 110.

The device 100 can generally be installed in a crown or upper region of an aircraft interior toward where typically stow bins are otherwise located, after removal of the stow bins or in place of stow bins. However it is understood that some embodiments can be installed in any region of a vessel while exhibiting relative motions described herein.

Figure 6:
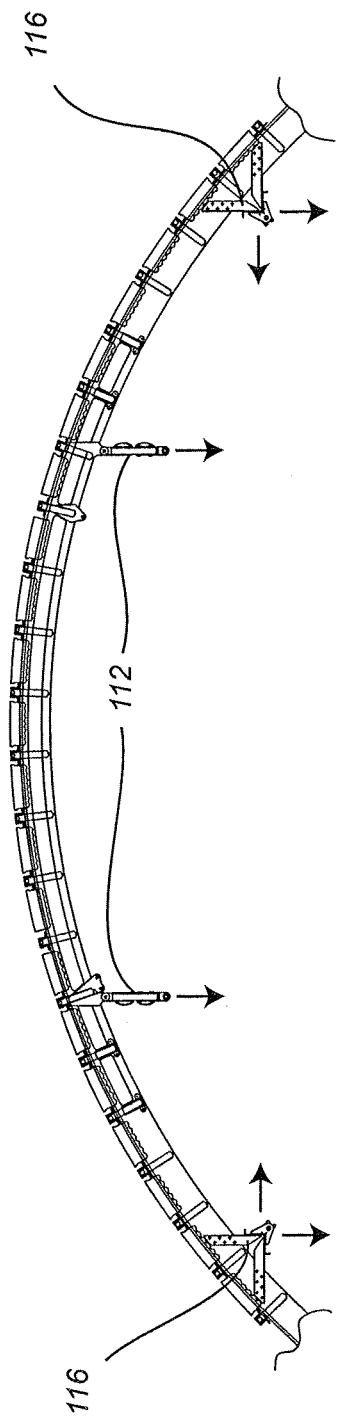
FIG. 6 is a front view of coupling regions of an overhead space utilization device and schematic depiction of directions in which movement is inhibited according to one embodiment.

FIG. 6 illustrates one embodiment of the intermediate support member 112 and fittings 116 of the device 100 along with schematic arrows depicting directions along which the berths 106 are inhibited from translating axially or linearly. Referring to FIGS. 1, 3, 4, and 6, in one embodiment, as the fuselage 103 deforms through flight, landing, take off, fueling, or the like, the berth module 102 can pivot toward the first and second berth portions 110, 114 on opposing berths 106 to prevent or inhibit exerting hardpoint stresses on the fuselage 103 and on the berth module 102. Furthermore, in an aspect, the above relative pivoting of the berth module 102 with respect to the fuselage 103 mitigates berth occupant(s) realizing fuselage 103 deformations, therefore, providing a comfortable atmosphere for occupants.

In the illustrated embodiment of FIGS. 3 through 6, the intermediate support member 112 being pivotably coupled at opposing ends to the fuselage 103 and berth module 102, respectively, prevents or inhibits side loads from being exerted from the berth module 102 to the fuselage 103. In an aspect, the second berth portion 114, the coupling member 120 is substantially fixedly coupled to the fuselage 103 via the fittings 116 and pivotably coupled to the berth module 102, transferring side loads to the fuselage 103.

This combination substantially prevents, inhibits, or mitigates adverse moments and bending in the fuselage portion between the aforementioned two berth coupling locations. In one aspect, this combination on opposing sides of the berth module 102 facilitates expansion or slight deformation of the berth modules 102 when the fuselage 103 pressurizes and expands. Such expansion in some embodiments can range from 0.01 inch to 0.10 inch, and in one example 0.3 inch. Other deflections and deflection measures are possible and contemplated. In the illustrated embodiment, the berth module 102 coupling to the fuselage 103, as described above, provides the berth module 102 lateral flexibility qualities to accommodate fuselage 103 expansion, contraction, and/or other deformation.

In one embodiment, as shown in FIGS. 3 and 4, the cross-sectional shape of the berth module 102 further may promote expansion or outboard deformation of the berth module 102 in response to the fuselage 103 expanding outboard due to pressurization or other reason. For example, in one embodiment, two panels lead from the first coupling portion 110 to the second coupling portion 114, and form upper boundaries of the berth module 102. These panels in one aspect form obtuse angle with between them, lending to better allowing the berth module 102 to expand. In some aspects, one or both of these panels can be removal to facilitate inspecting the fuselage 103 section above the berth module 102.

Figure 7:
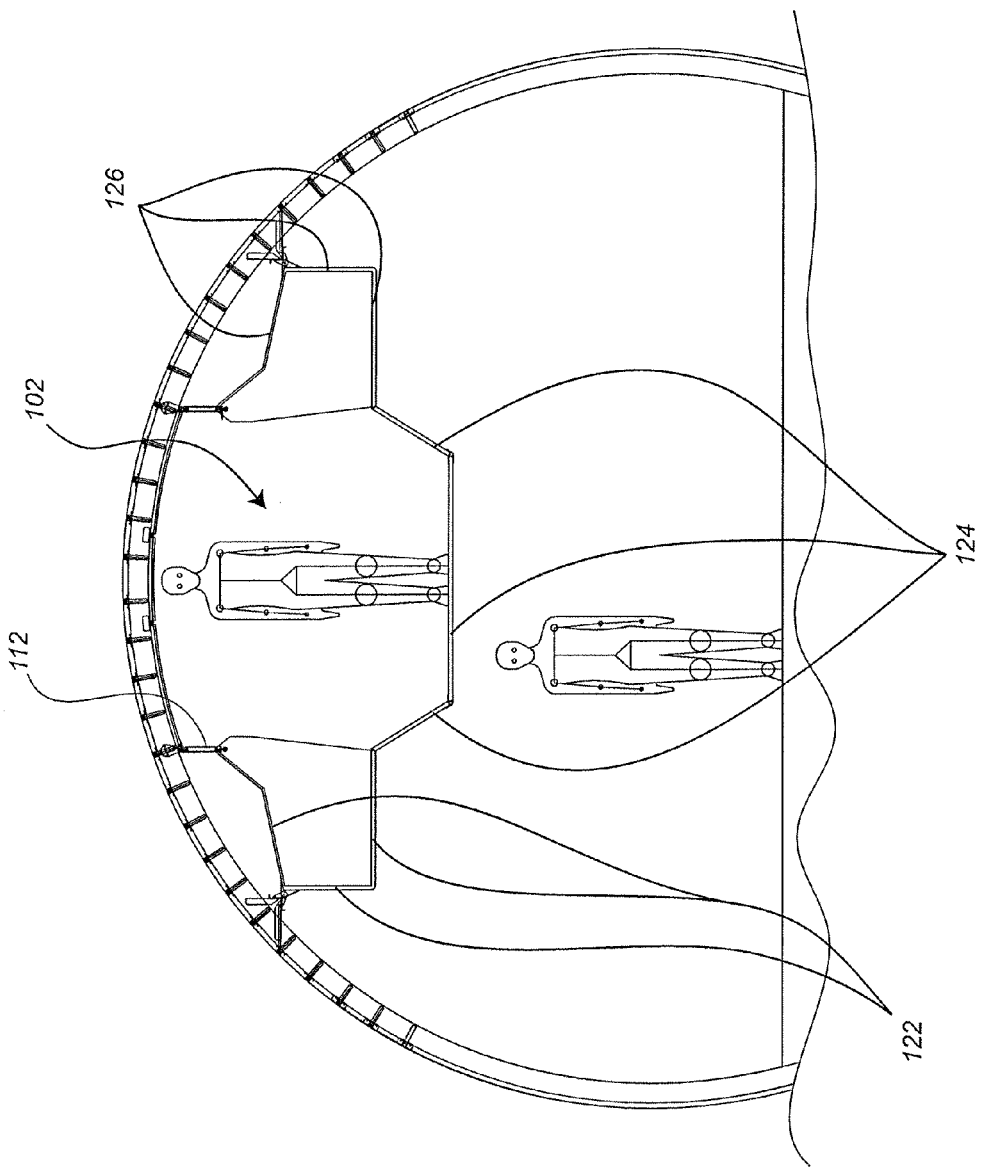
FIG. 7 is a partial cross-sectional view of the aircraft fuselage and overhead space utilization device of FIG. 2, taken across section 7-7.

Referring to FIG. 7, in one embodiment, the berth module 102 can be made from three sections 122, 124, 126. In one aspect the three sections 122, 124, 126 are coupled to one another. In some embodiments, one or more connections between these sections or portions of these sections can be movably or pivotably coupled to each other. In one embodiment, the coupling region between lower section 124 and side sections 122, 126, respectively, can be hinged or pinned to allow limited pivoting of these sections with respect to each other and accommodate berth module 102 expansion discussed above. In some embodiments, a fitting and/or formed plate can be used to further couple the lower section 124 to side sections 122, 126, respectively.

The panels making up the three sections 122, 124, 126 can include any suitable material, including any material exhibiting at least some elastic properties to allow slight deformations and expansions, including but not limited to various metals such as aluminum, composites such as fiberglass, various honeycomb material, Kevlar®, Teklam®, polymeric or fiber-reinforced polymeric material, thermoplastics, composite laminates and/or carbon fiber, or any combination thereof, or any other suitable material.

Figure 8:
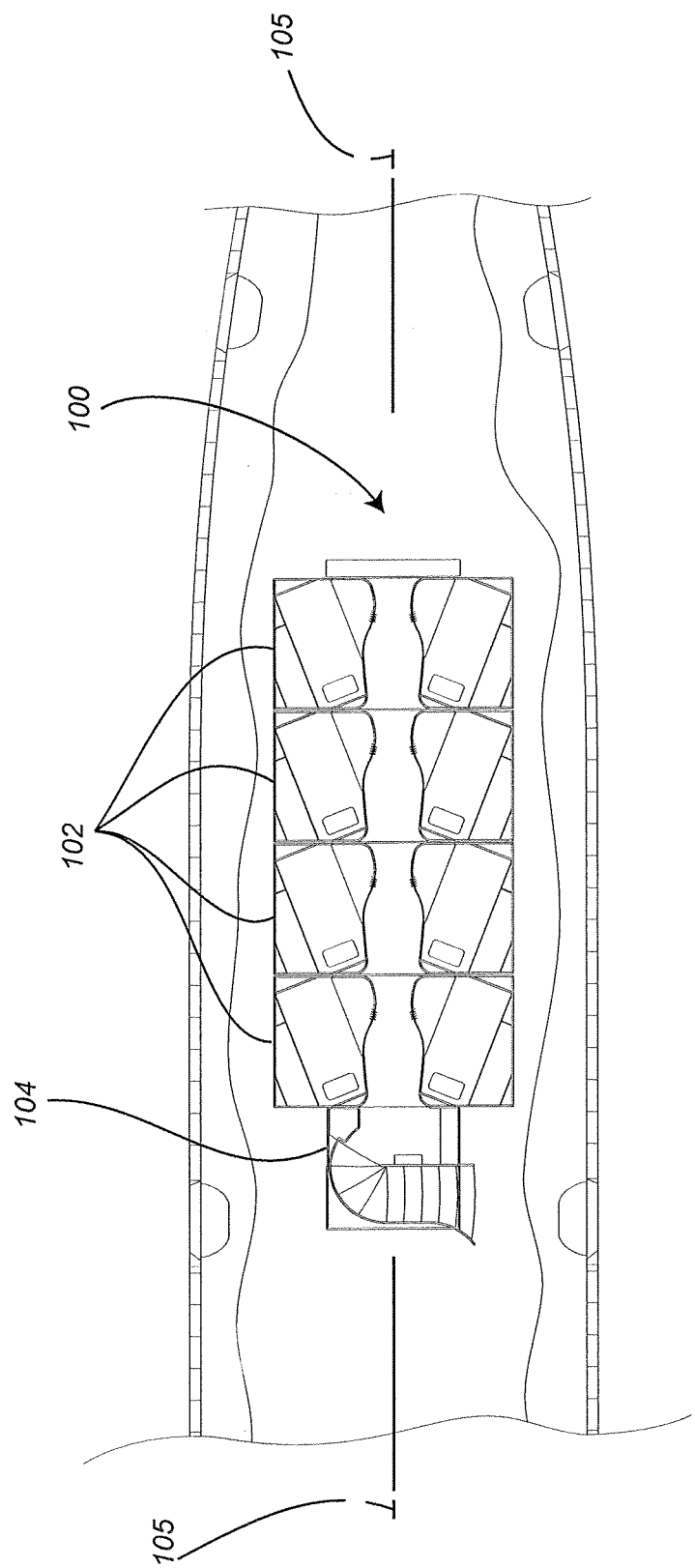
FIG. 8 is a cutaway view of an aircraft fuselage illustrating a plan view of an overhead space utilization device according to an embodiment.

In one embodiment as illustrated in FIG. 8, the device 100 may include multiple berth modules 102 and coupled to the stair module 104 toward one end. In one aspect the berth modules 102 can be coupled to adjacent berth modules 102. In some embodiments, the berth modules 102 can be coupled via a common coupling device to the fuselage 103 or to the intermediate support member 112 (FIG. 7).

Figure 9:
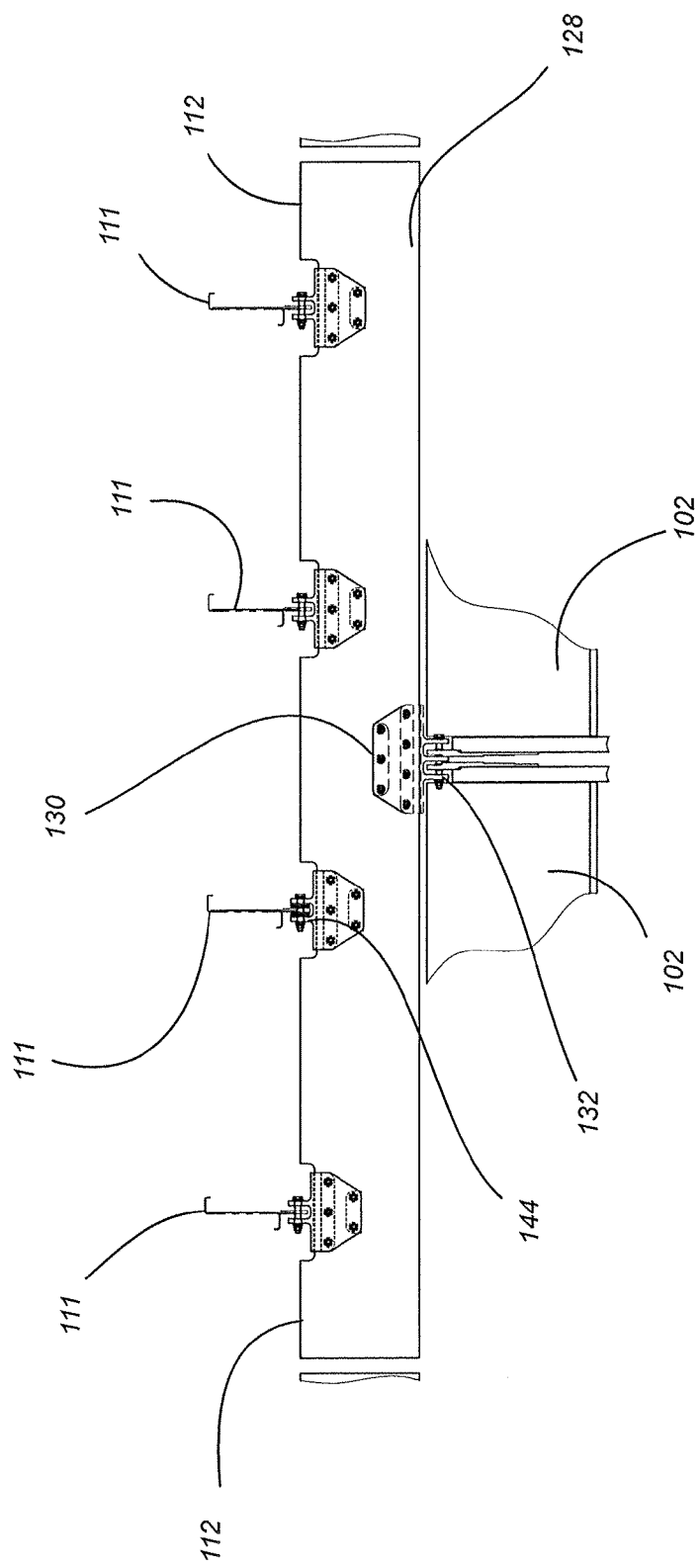
FIG. 9 is a side view of a portion of an overhead space utilization device coupling the device to the fuselage according to an embodiment.

For example, in the embodiment illustrated in FIG. 9, the intermediate support member 112 discussed earlier can include a support beam 128 extending along an axis parallel to the fuselage longitudinal axis 105 (FIG. 1) and being pivotably coupled via respective pivotable coupling members 144, such as a hinge or a pivotable fitting or the like, to a plurality of fuselage frames 111 toward a first end or side of the support beam 128. In one aspect the device 100 includes a berth coupling member 130 pivotably coupled to adjacent berth modules 102. For example, in one aspect the berth coupling member 130 can include a plate fixedly coupled to the support beam 128 and a clevis member pivotably coupled to adjacent berth modules 102.

As shown in FIG. 9, in some embodiments, multiple support beams 128 can be used to prevent the support beam 128 from picking up unwanted fuselage loads. In one aspect, the support beam 128 is coupled to multiple frames 111 distributing berth 102 loads therebetween.

Figure 10:
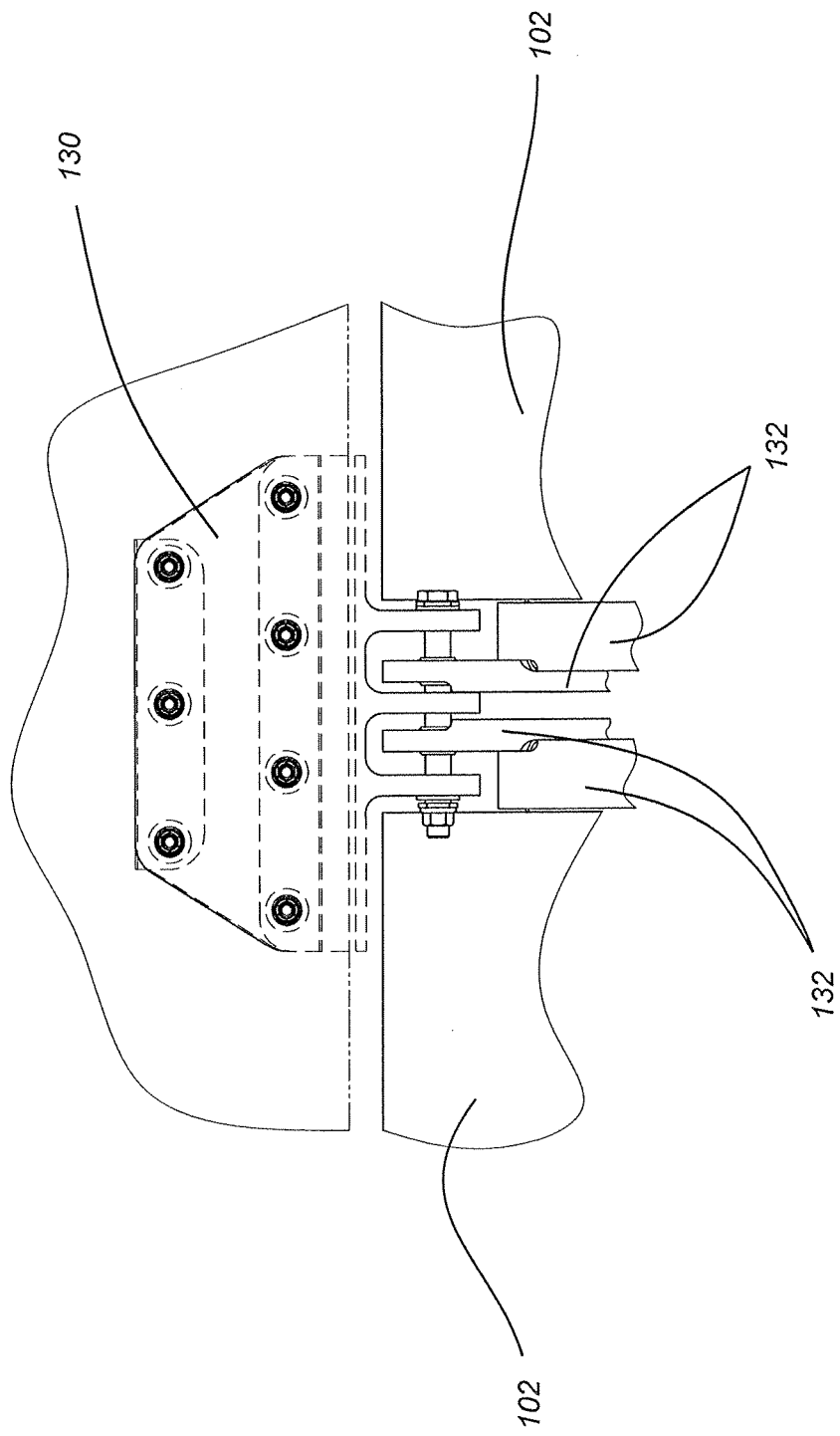
FIG. 10 is a side view of a portion of the coupling portion the overhead space utilization device of FIG. 9 according to an embodiment.

In one embodiment, the intermediate support member 112 can include structure or members to independently or separately receive each berth module 102. For example, as illustrated in FIG. 10, in one embodiment, the berth coupling member 130 can be configured to separately be coupled to each berth module 102 through distinct coupling portions 132 of each berth module 102. In such embodiments a large set of multiple berths can form a long structure along the aircraft without overly stiffening the aircraft fuselage 103 (FIG. 2). In some embodiments, each berth may also be coupled to the fuselage 103 or to the beam 128 via an adjustable tie-rod, for example extending longitudinally for adjusting berth positions with respect to each other.

In other embodiments, the berth coupling member can be pivotably coupled to the support beam and the adjacent berths, or be fixedly coupled to the berths and pivotably coupled to the support beam.

Figure 11:
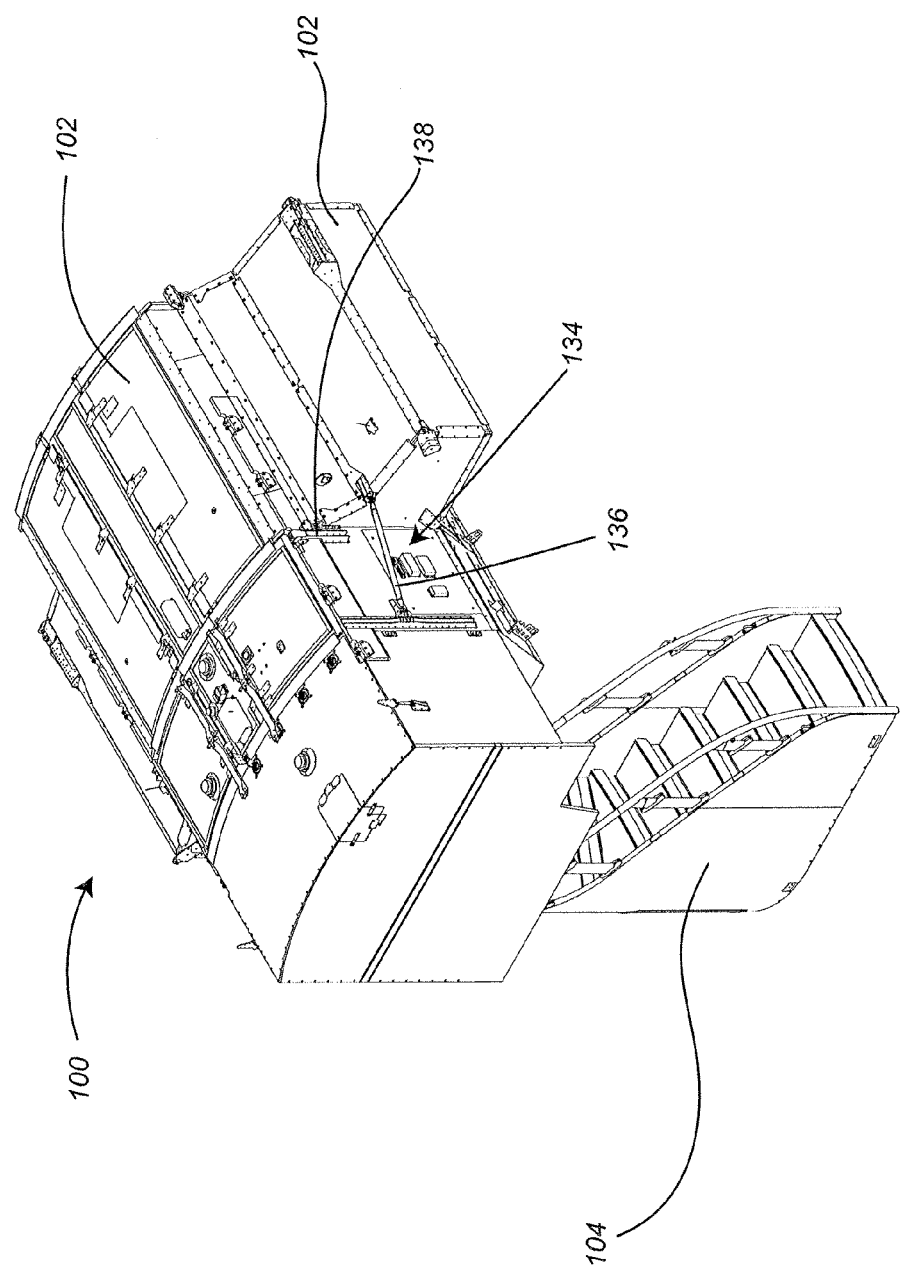
FIG. 11 is an isometric view of a portion of an overhead space utilization device according to an embodiment.

In one embodiment, as illustrated in FIG. 11, an upper region of the stair module 104 can be stabilized through at least one coupling or stabilizing assembly 134 connecting the stair module 104 to at least one of the berth modules 102. For example, in one aspect, the stabilizing assembly 134 may include a drag brace or tie-rod 136 coupling a portion of the stair module 104 to a portion of the berth module 102. In one embodiment, the drag brace 136 can be pivotably coupled to the stair module 104 and berth module 102, toward opposing ends of the drag brace 136. In another embodiment, the drag brace 136 can be fixedly coupled to at least one of the stair module 104 and berth module 102.

In some embodiments, the stabilizing assembly 134 can include coupling plates or stiffeners 138 spanning at least a portion of the stair module 104 and at least a portion of the berth module 102.

In some embodiments, other types of modules can be incorporated or coupled to the berth modules.

Figure 12:
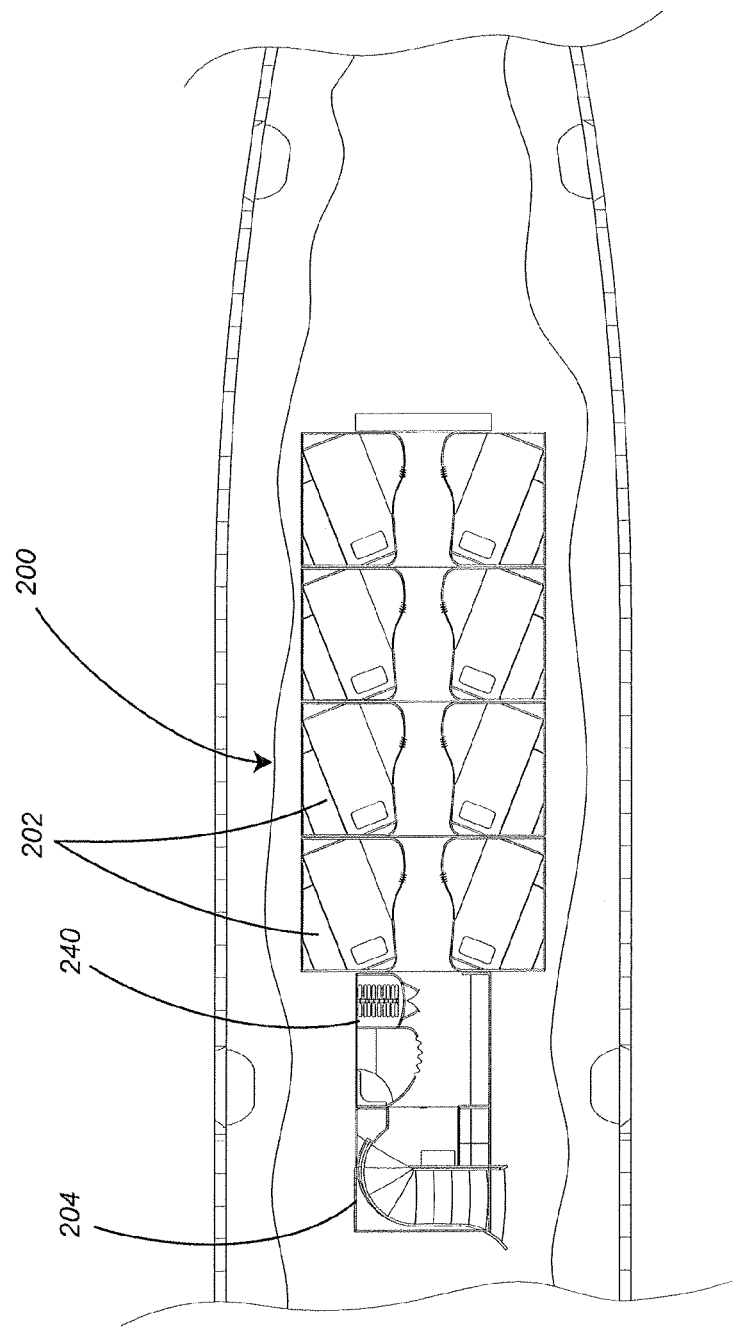
FIG. 12 is a cutaway view of an aircraft fuselage and a plan view of an overhead space utilization device according to an embodiment.

For example, FIG. 12 illustrates an embodiment of an overhead space utilization device 200, which includes a plurality of berth modules 202 and stair module 204, and a lounge module 240 coupled therebetween. In one embodiment, the lounge module 240 and stair module 204 can be integrated or fixedly coupled to each other.

In some embodiments, the lounge module 240 can be pivotably coupled to at least one of the berth module 202 and the stair module 204.

Figure 13:
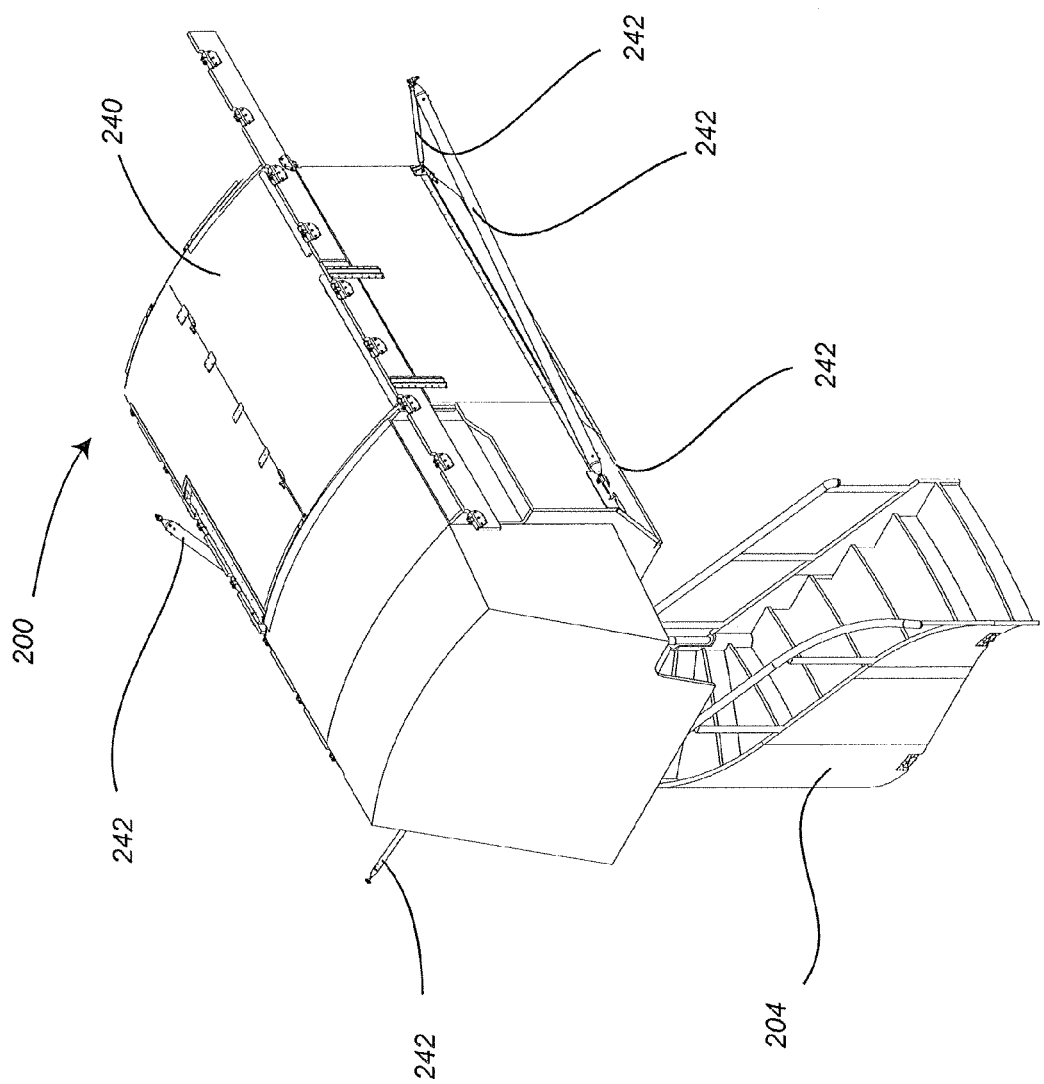
FIG. 13 is an isometric view of a portion of an overhead space utilization device according to an embodiment.

In some embodiments, as illustrated in FIG. 13, at least one of the lounge module 240 and stair module 204 can be supported and/or stabilized through at least one or more drag braces or tie-rods 242 configured to couple the lounge module 240 and/or stair module 204 to the fuselage of the aircraft. The drag braces 242 in one embodiment are pivotably coupled to the fuselage and stair module 204 and/or lounge module 240, toward opposing ends of the respective drag braces 242. In some embodiments, the stair and lounge modules can be integrated.

In some embodiments, an overhead space utilization device can also be coupled, or allow occupants to move from the overhead space utilization device, to an existing structure or enclosure in an aircraft.

Figure 14:
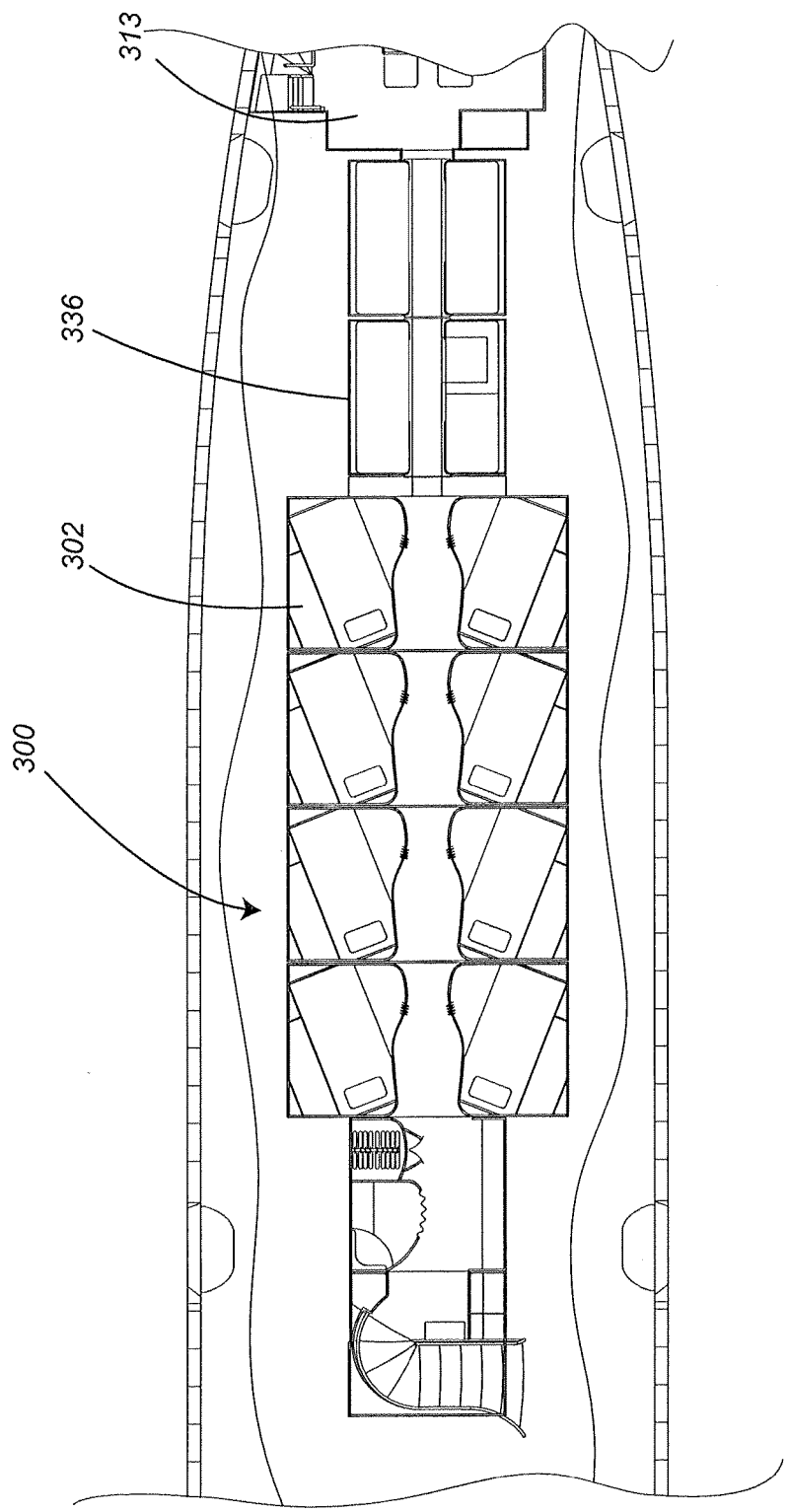
FIG. 14 is a cutaway view of an aircraft fuselage and a plan view of an overhead space utilization device according to an embodiment.

For example, in one embodiment as illustrated in FIG. 14, an overhead space utilization device 300 can further include additional modules such as changing or storage rooms 336, which can be integrated similarly to that described with respect to the lounge module above. In some embodiments, the device 300 can be configured to be installed in an aircraft having a crew rest area 313. In one aspect, the device 300 can include an end berth module 302 configured to be coupled to, or positioned adjacent, an entry to the crew rest area 313. The device 300 may include an adaptor plate pivotably or fixedly coupling end berth module 302 to a portion of the crew rest area 313.

In some embodiments, a flight attendant seat and station may be incorporated into the overhead space utilization device. In some embodiments, in-flight entertainment panels and controls may be incorporated in each berth of an overhead space utilization device. In some embodiments, control panel and environmental controls of an overhead space utilization device may be integrated with the main cabin controls.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An overhead space utilization device adapted to install in a hull structure, the device comprising:
at least one berth module having a first berth member and an opposing second berth member, each of the first berth member and the second berth member having a first location and a second location respectively configured to be pivotably coupled to the hull structure;
a walkway positioned between, and pivotably coupled to, the first and second berth members;
a first support beam extending generally parallel to a longitudinal axis of the hull structure, the first support beam having a first side pivotably coupled to the first location of the first berth member and a second side configured to be pivotably coupled to the hull structure; and
a second support beam extending generally parallel to the longitudinal axis of the hull structure, the second support beam having a first side pivotably coupled to the first location of the second berth member and a second side configured to be pivotably coupled to the hull structure.

2. The device of claim 1, further comprising:
first and second coupling members configured to pivotably couple the second location of each of the first and second berth members to the hull structure, wherein the first and second coupling members and the second locations are configured to be positioned outboard of the first locations, respectively.

3. The device of claim 2 wherein the first and second support beams and the first and second coupling members are configured to inhibit berth module movement along an axis substantially parallel to a yaw axis of the hull structure.

4. The device of claim 1, further comprising:
more than one berth module wherein the more than one berth modules are positioned adjacent one another and independently pivotably coupled to at least one of the first and second support members.

5. The device of claim 1, further comprising:
a stair module positioned adjacent the at least one berth module; and
at least one drag brace having first and second ends, the first end pivotably coupled to the stair module and the second end configured to be pivotably coupled to at least one of the hull structure and the berth module.

6. An overhead space utilization device comprising:
a berth module having two opposing berths and configured to be installed in an aircraft fuselage, each berth having:
first and second coupling locations, the first coupling location positioned above and inboard the second coupling location when the berth module is installed;
a support fitting having first and second isolated brackets, each of the first and second isolated brackets having distal ends configured to be fixedly coupled to the fuselage and proximal ends converging toward each other with a space between the proximal ends;
a rail member coupled to the first and second isolated brackets toward the proximal ends thereof; and
a coupling member coupled to the second coupling location of a corresponding one of the opposing berths and pivotably coupled to the rail member.

7. The overhead space utilization device of claim 6, further comprising:
first and second support beams, each of the first and second support beams having first and second ends, and configured to be pivotably coupled to the fuselage toward the first end and pivotably coupled to the first coupling location of a corresponding one of the opposing berths.

8. The device of claim 6 wherein the berth module is made from a material that is elastic.

9. The device of claim 8 wherein the material includes at least one of aluminum, composite, and honeycomb.

10. An aircraft comprising:
a fuselage;
a first berth having first and second locations respectively pivotably coupled to the fuselage;
a second berth having first and second locations respectively pivotably coupled to the fuselage;
a first walkway positioned between, and pivotably coupled to, the first and second berths;
a first support beam extending generally parallel to a longitudinal axis of the fuselage, the first support beam having a first side pivotably coupled to the first location of the first berth and a second side pivotably coupled to the fuselage; and
a second support beam extending generally parallel to the longitudinal axis of the fuselage, the second support beam having a first side pivotably coupled to the first location of the second berth and a second side pivotably coupled to the fuselage.

11. The aircraft of claim 10 wherein the first location of the first and second berths is pivotably coupled to the fuselage to pivot about two axes.

12. The aircraft of claim 10, further comprising:
a third berth adjacent the first berth, and having first and second locations respectively pivotably coupled to the fuselage;
a fourth berth adjacent the second berth, and having first and second locations respectively pivotably coupled to the fuselage; and
a second walkway positioned between, and pivotably coupled to, the third and fourth berths, the first and second support beams pivotably coupling the third and fourth berths to the fuselage, respectively, the first and third berths being independently pivotably coupled to the first support beam and the second and fourth berths being independently pivotably coupled to the second support beam.

13. The aircraft of claim 10 wherein the second location of each of the first and second berths includes:
a support fitting having first and second isolated brackets respectively having distal ends fixedly coupled to the fuselage and proximal ends converging toward each other with a space between the proximal ends;

a rail member coupled to the first and second isolated brackets toward the proximal ends thereof; and a coupling member coupled to the second coupling location of a corresponding one of the opposing berths and pivotably coupled to the rail member.

14. An overhead space utilization device adapted to install in a hull structure, the device comprising:

at least one berth module having a first berth and an opposing second berth and a first walkway therebetween, each of the first and second berths having a first berth portion and a second berth portion;

first and second intermediate support members, each of the first and second intermediate support members having first and second ends, the first ends pivotably coupled to the corresponding first portions of the first and second berths, and the second ends configured to pivotably coupled to the hull structure;

first and second coupling members configured to pivotably couple the second berth portions of the first and second berths, respectively, to the hull structure, wherein the first and second coupling members and the second berth portions are configured to be positioned outboard of the corresponding first berth portions;

a stair module positioned adjacent the at least one berth module; and at least one drag brace having first and second ends, the first end of the at least one drag brace pivotably coupled to the stair module and the second end of the at least one drag race configured to be pivotably coupled to at least one of the hull structure and the at least one berth module.

15. The device of claim 14 wherein each of the first and second births includes:

a support fitting having first and second isolated brackets respectively having distal ends fixedly coupled to the hull structure and proximal ends converging toward each other with a space between the proximal ends;

a rail member coupled to the first and second isolated brackets toward the proximal ends thereof; and a coupling member coupled to the second berth portions of a corresponding one of the first and second berths and pivotably coupled to the rail member.

\* \* \* \* \*